June 8, 1948. H. K. RICHARDSON 2,442,860
MOLDING GLASS ARTICLES
Original Filed Aug. 11, 1938
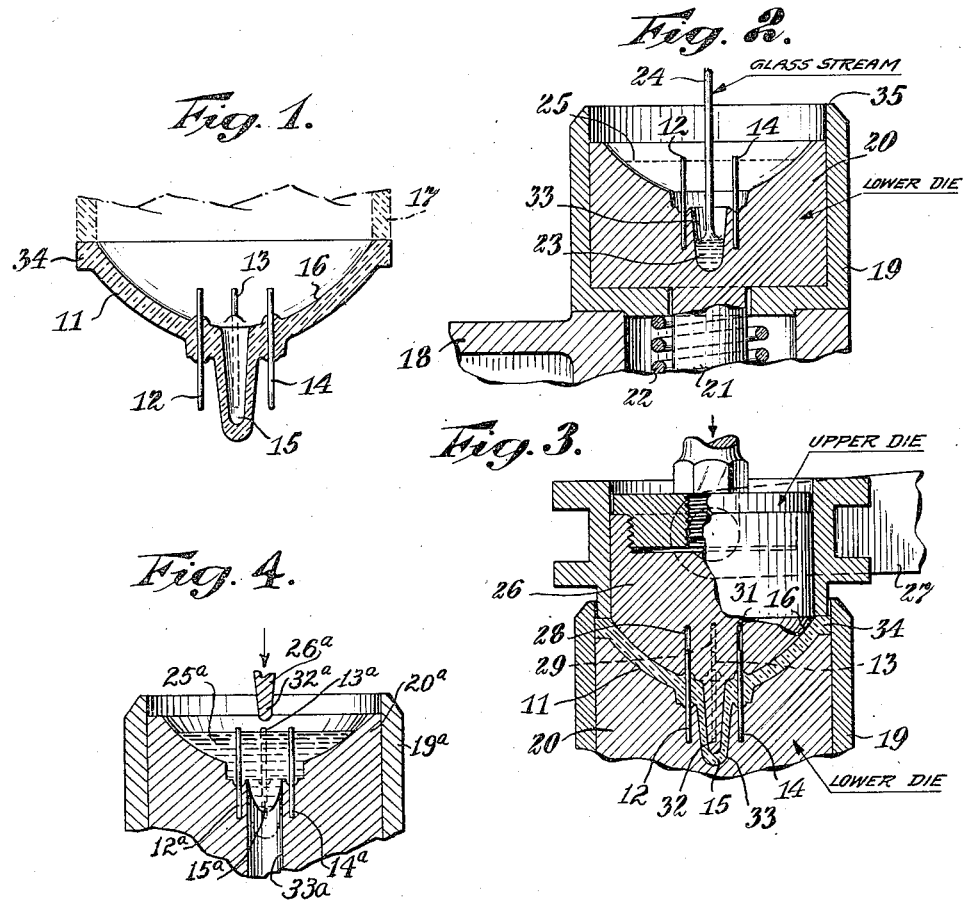
INVENTOR
H.K. RICHARDSON
BY
ATTORNEY Patented June 8, 1948

2,442,860

UNITED STATES PATENT OFFICE 2,442,860

MOLDING GLASS ARTICLES

Henry K. Richardson, Bloomfield, N. J., assignor to Westinghouse Electric Corporation, East Pittsburgh, Pa., a corporation of Pennsylvania Continuation of application Serial No. 224,287, August 11, 1938. This application October 10, 1942, Serial No. 461,537

7 Claims. (Cl. 49—66)

This application is a continuation of my application Serial No. 224,287, filed August 11, 1938, and subsequently abandoned, and owned by the assignee of the present application.

This invention relates to the manufacture of glass articles, and more particularly to molding reflector portions which may serve as parts of lamp envelopes.

The principal object of my invention, generally considered, is the manufacture of electric lamps by a process in which at least one part is formed by molding molten glass about conductors.

Another object of my invention is the manufacture of the reflector portion of a lamp by molding glass, at the same time incorporating lead wires and an exhaust tube therewith, said reflector portion to be subsequently completed by coating with a film of suitable metal in any desired manner.

A further object of my invention is the formation of lamp bulbs by molding a cupped portion of each bulb.

Other objects and advantages of the invention, relating to the particular arrangement and construction of the various parts will become apparent as the description proceeds.

Referring to the drawings:

Fig. 1 is a vertical sectional view of the reflector portion of a lamp embodying my invention, the cover portion or remainder of the bulb thereof being fragmentarily illustrated in dotted lines.

Fig. 2 is a vertical sectional view of the lower die or lower portion of a mold in which the reflector portion shown in Fig. 1 may be cast or formed, illustrating the process of filling the mold with molten glass from a stream.

Fig. 3 is a view corresponding to Fig. 2, but showing the subsequent position where the glass stream has been cut off and the upper die brought into operative relation with respect to the lower die, or lower portion of the mold, to cause the glass to rise and completely fill the mold, in order to form the desired glass part.

Fig. 4 is a fragmentary view corresponding to to Fig. 2, but showing a modification.

Referring to the drawings in detail, and first considering the embodiment of my invention illustrated in Figs. 1, 2, and 3, there is shown a glass lamp base or reflector portion 11 containing three lead wires 12, 13, and 14, and an exhaust tube 15, all parts of which are molded in place, as will be explained in connection with Figs. 2 and 3. The inside surface 16 of the base or reflector portion of the lamp bulb may, at a suitable time, be coated with a light reflecting surface such as a layer of suitable metal, thereby forming a concave mirror surface, as will be understood. The cover portion 17 or remainder of the lamp bulb shown diagrammatically in dotted lines, may be secured to the base or reflector portion 11 in any suitable manner.

Figs. 2 and 3 show apparatus which may be employed for molding glass bases or reflector portions 11, such as illustrated in Fig. 1. A table or support is indicated at 18, and mounted thereon is a mold guiding member 19 in which is slidably mounted the lower mold element or die 20 having a portion 21 extending downwardly therefrom and normally acted on by coil return spring 22 to hold it in its lowermost or normal position, as shown in Fig. 2, where it is adapted to receive molten glass 23, as from a stream 24 issuing from a furnace, not shown.

In order to accurately predetermine the amount of glass fed to the lower die or mold element 20, I desirably employ a stream 24 issuing from a glass melting furnace (not shown), through an orifice provided with a die (not shown) which die, however, is preferably formed of an alloy of platinum and rhodium, such as described and claimed in Patent No. 2,031,083, dated February 18, 1936, or my Patent No. 2,190,296, dated February 13, 1940.

The temperature of said stream is desirably maintained uniform by sighting a radiation pyrometer thereon and controlling the heat of the furnace by means of apparatus such as described and claimed in the Patent No. 2,116,450, dated May 3, 1938; so that an accurately controlled amount of glass is fed to each mold as it passes under the stream 24.

In order to make the reflector or base forming operation continuous, I desirably have a series of molds, such as shown in Figs. 2 and 3, and cause the same to move under the stream of freely flowing molten glass one by one, to receive the charge required and then pass on to make way for the next mold, in a manner such as described and claimed in the copending application of Richardson et al., Serial No. 205,180, filed April 30, 1938, now Patent No. 2,393,265, dated January 22, 1946, and owned by the assignee of the present application. When the glass has risen to the proper level in the die 20, such, for example, as indicated by the dotted line 25, the stream 24 is cut off, or the die 20 moved from thereunder, and the upper die or mold element 26 moved downwardly into the position shown in Fig. 3, as by means of the actuating arm 27, to thereby form the glass base or reflector portion 11.

In order to properly form the base portion 11, the upper die or mold element 26 has apertures or cavities 28, 29, and 31 which receive the upper ends of the lead wires 12, 13, and 14, positioned in corresponding cavities in the lower die or mold element 20, as shown in Figs. 2 and 3. The upper die or mold element 26 also has a downwardly extending projection 32 which fits, with clearance corresponding with the desired wall thickness, the upwardly opening pocket, cavity or hole 33 in the lower die or mold element 20, thereby serving to form the exhaust tube portion 15 of the base or reflector element 11.

After the glass base or reflector element 11 has been formed in the die, as shown in Fig. 3, and has hardened sufficiently by cooling, the upper die or mold element 26 is raised and the glass member 11 ejected from the lower die by moving the ejector extension 21 upwardly, against the action of the spring 22, until the edge or rim portion 34 of the glass element 11 passes above the upper edge 35 of the die guide 19, when the glass element 11 may be removed from said die in any desired manner, or will be automatically loosened and removed from the lower die 20 by engagement of the upper edge portion 35 therewith when said lower die is returned to normally lowered position.

Upon removal of the formed glass member 11, the lower die 20 may move to receive another charge of glass from the stream 24, so that the operation is repeated.

Referring now to the embodiment of my invention illustrated in Figure 4, there is shown a lower mold element or die 20ª, which is preferably slidably mounted in a mold guiding member 19ª, as in the embodiment of Figs. 1, 2, and 3. As in said first embodiment, the die 20ª may have a downwardly extending portion normally acted upon by a coil spring to hold it in its lowermost or normal position, where it is adapted to receive molten glass, as from a stream issuing from a furnace, not shown.

As in the preceding embodiment, an upper die or mold element 26ª, corresponding with the die 26, is desirably employed, having a downwardly extending projection 32ª which fits, with clearance corresponding with the desired wall thickness, the aperture 33ª in the lower die or mold element 20ª, thereby serving to form the exhaust tube portion of a base or reflector element 11. The lower mold element 20ª differs from the element 20 of the preceding embodiment, in that instead of having a mere upwardly opening pocket or cavity, the hole or aperture 33ª extends from top to bottom of the die, thereby facilitating cleaning or removal of material which may be caught therein.

The glass 25ª which has been fed to the mold, as described in connection with the preceding embodiment, is sufficiently viscous, because of the cooling action of the mold, that it will not run through the aperture 33ª, but will hang therein, as indicated at 15ª, and be pushed down the proper distance by the projection 32ª, when the upper die is lowered into registering relation therewith. Thus, a glass base portion approximating that shown in Fig. 1, may be formed, as the lower die 20ª desirably holds lead wires 12ª, 13ª, and 14ª, as in the preceding embodiment.

From the foregoing disclosure, it will be seen that I have devised apparatus for molding glass parts, in which the lead-in conductors and exhaust tubes are incorporated with the part during the process of molding, thereby avoiding some of the subsequent steps previously employed.

It will also be understood that although I have shown a molded glass article of a certain shape, yet other shapes may be molded in the same way, with or without leads and/or exhaust tubes incorporated therewith at the time of molding. It should therefore be clear that my invention is limited only by the spirit and scope of the appended claims.

I claim:

1. Apparatus comprising a cup-like lower mold element adapted to receive freely flowing molten glass and formed with openings to receive and hold elongated conductors in generally upright positions, a guide member in which said lower mold element is vertically movable and which has sides projecting above the normal position of the upper edge of said lower mold element, said lower mold element having a generally central opening to receive an extension on a part to be molded, and a cooperatively-formed upper mold element having openings to receive the upper portions of said conductors and a projection receivable in said generally central opening with clearance desired for molding a tubular extension on the article to be made, whereby said upper mold element may be forced down into a charge of molten glass around conductors held in the lower mold element, to cause the glass level to rise above said lower mold element in said guide member, and the glass to fill the space defined by said mold elements and guide member, to form a glass article with an integral extension to function as an exhaust tube and molded-in-place conductors to function as current-carrying leads.

2. Apparatus comprising a cup-like lower mold element adapted to receive molten glass and having a generally central opening to receive an extension on a part to be molded, and a cooperatively-formed upper mold element fitting the lower mold element with clearance allowing for the thickness of the part to be molded, and having a projection receivable in said generally central opening with clearance desired for molding a tubular extension on the article to be made, whereby said upper mold element may be forced down into a charge of molten glass in the lower mold element, to cause the glass level to rise and the glass to fill the space defined by said mold elements, to form a glass article with an integral extension adapted to function as an exhaust tube.

3. Apparatus comprising a cup-like lower mold element adapted to receive freely flowing molten glass and formed with pockets to receive and hold elongated conductors in generally upright positions, and a cooperatively-formed upper mold element having openings to receive the upper portions of said conductors when the mold elements come together, whereby said upper mold element may be forced down into a charge of molten glass around conductors held by said lower mold element to cause the glass level to rise in said lower mold element and the glass to fill the space defined by said elements to form a glass article with molded-in-place conductors adapted to function as current-carrying leads.

4. Apparatus comprising a cup-like lower mold element adapted to receive freely flowing molten glass, formed with openings to receive and hold elongated conductors in generally upright positions, and having a generally central opening to receive an extension on a part to be molded, and a cooperatively-formed upper mold element having openings to receive upper portions of said conductors and a projection receivable in said generally central opening with clearance desired for molding a tubular extension on the article to be made, whereby said upper mold element may be forced down into a charge of molten glass around conductors held in place in the lower mold element to cause the glass level to rise in said lower mold element and fill the space defined by said mold elements, to form a glass article with an integral extension to function as an exhaust tube and molded-in-place conductors adapted to function as current carrying leads.

5. Apparatus comprising a cup-like lower mold element adapted to receive freely flowing molten glass and formed with openings to receive and hold elongated conductors in generally upright positions, a guide member in which said lower mold element is vertically movable and which has sides projecting above the normal position of the upper edge of said lower mold element, and a cooperatively-formed upper mold element having openings to receive the upper portions of said conductors, whereby said upper mold element may be forced down into a charge of molten glass around conductors held in said lower mold element to cause the glass level to rise above said lower mold element in said guide member and the glass to fill the space defined by said mold elements and guide member, to form a glass article with molded-in-place conductors adapted to function as current carrying leads.

6. Apparatus comprising a cup-like lower mold element adapted to receive freely flowing molten glass and formed with a generally central opening to receive an extension on a part to be molded, a guide member in which said lower mold element is vertically movable and which has sides projecting above the normal position of the upper edge of said lower mold element, and a cooperatively-formed upper mold element having a projection receivable in said generally central opening with clearance desired for molding a tubular extension on the article to be made, whereby said upper mold element may be forced down into a charge of molten glass in the lower mold element to cause the glass level to rise above said lower mold element in said guide member and the glass to fill the space defined by said mold elements and guide member, to form a glass article with an integral extension adapted to function as an exhaust tube.

7. Apparatus comprising a cup-like lower mold element adapted to receive freely flowing molten glass, a guide member in which said lower mold element is vertically movable and which has sides projecting above the normal position of the upper edge of said lower mold element, and a cooperatively-formed upper mold element adapted to be forced down into a charge of molten glass in said lower mold element to cause the glass level to rise above said lower mold element in said guide member and the glass to fill the space defined by said mold elements and guide member, to form a glass article.

HENRY K. RICHARDSON.

REFERENCES CITED

The following references are of record in the file of this patent:

UNITED STATES PATENTS

| Number | Name | Date |
| --- | --- | --- |
| 235,522 | Geyer | Dec. 14, 1880 |
| 796,470 | Swan | Aug. 8, 1905 |
| 1,149,038 | Ficq | Aug. 3, 1915 |
| 1,606,276 | Vello | Nov. 9, 1926 |
| 1,660,649 | Mailey | Feb. 26, 1928 |
| 1,861,167 | Vello | May 31, 1932 |
| 1,965,408 | Eden et al. | July 3, 1934 |
| 2,006,818 | Zimber | July 2, 1935 |
| 2,030,186 | Rose | Feb. 11, 1936 |
| 2,120,836 | Grimes | June 14, 1938 |
| 2,131,923 | Thomas | Oct. 4, 1938 |
| 2,134,551 | Enfield | Oct. 25, 1938 |
| 2,148,314 | Wright | Feb. 21, 1939 |
| 2,177,217 | Howard et al. | Oct. 24, 1939 |
| 2,315,292 | Richardson et al. | Mar. 30, 1943 |
| 2,219,574 | Fraenckel | Oct. 29, 1940 |

FOREIGN PATENTS

| Number | Country | Date |
| --- | --- | --- |
| 12,015 | Great Britain | 1887 |